United States Patent
Roundy et al.

(10) Patent No.: US 9,275,226 B1
(45) Date of Patent: Mar. 1, 2016

(54) SYSTEMS AND METHODS FOR DETECTING SELECTIVE MALWARE ATTACKS

(71) Applicant: Symantec Corporation, Mountain View, CA (US)

(72) Inventors: Kevin Roundy, El Segundo, CA (US); Sandeep Bhatkar, Sunnyvale, CA (US); Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 127 days.

(21) Appl. No.: 14/029,451

(22) Filed: Sep. 17, 2013

(51) Int. Cl.
  *G06F 11/00* (2006.01)
  *G06F 12/14* (2006.01)
  *G06F 12/16* (2006.01)
  *G06F 21/56* (2013.01)

(52) U.S. Cl.
  CPC .................................... *G06F 21/56* (2013.01)

(58) Field of Classification Search
  CPC ....... G06F 21/55; H04L 67/20; H04L 67/306; H04L 67/22
  USPC ............................................................ 726/24
  See application file for complete search history.

(56) References Cited

U.S. PATENT DOCUMENTS

| | | | |
|---|---|---|---|
| 8,893,042 B2* | 11/2014 | Laurie | G06F 17/30873 715/811 |
| 2006/0253584 A1* | 11/2006 | Dixon | G06Q 30/02 709/225 |
| 2011/0083185 A1* | 4/2011 | Sheleheda | G06F 21/552 726/24 |
| 2014/0317754 A1* | 10/2014 | Niemela | H04L 63/1416 726/26 |

* cited by examiner

*Primary Examiner* — Eleni Shiferaw
*Assistant Examiner* — David Massie
(74) *Attorney, Agent, or Firm* — Holland & Hart, LLP (57) ABSTRACT

A computer-implemented method for detecting selective malware attacks is described. A website visited by a user is identified based on a number of visits to the website satisfying a predetermined threshold. A web crawl is performed on the identified website. Results of the web crawl are analyzed to determine whether the identified website includes a malicious software attack designed to selectively attack visitors to the website.

11 Claims, 7 Drawing Sheets

┌──────────────────────────────────────────────────────────────────────────┐
505 ─┤ Web crawl a selected website using an on-premises device located at a │
     │                       predetermined location                          │
     └──────────────────────────────────────────────────────────────────────┘
                                        ↓
┌──────────────────────────────────────────────────────────────────────────┐
510 ─┤ Web crawl the selected website using a server at a location different from │
     │                     the predetermined location                        │
     └──────────────────────────────────────────────────────────────────────┘
                                        ↓
┌──────────────────────────────────────────────────────────────────────────┐
515 ─┤ Identify a low prevalence file from the results of at least one of the web crawls │
     │            performed by the on-premises device and the server         │
     └──────────────────────────────────────────────────────────────────────┘
                                        ↓
┌──────────────────────────────────────────────────────────────────────────┐
520 ─┤ Perform a virus scan on the low prevalence file to determine whether the │
     │                   low prevalence file is malicious                    │
     └──────────────────────────────────────────────────────────────────────┘
```

SYSTEMS AND METHODS FOR DETECTING SELECTIVE MALWARE ATTACKS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

With the wide-spread use of computers and mobile devices has come an increased presence of email, text message, and web-based attacks. One attack in particular involves attack artists setting up selective malware attacks on the internet. Unsuspecting visitors to certain websites may unknowingly and/or unintentionally download malware from a visited website, causing potential loss of data

SUMMARY

According to at least one embodiment, a computer-implemented method detecting selective malware attacks is described. A website visited by a user is identified based on a number of visits to the website satisfying a predetermined threshold. A web crawl is performed on the identified website. Results of the web crawl are analyzed to determine whether the identified website distributes a malicious software attack designed to selectively attack visitors to the website.

In one embodiment, an operation of the computer-implemented method may determine whether a web crawl of the identified website performed by a predetermined server results in the predetermined server detecting the low prevalence file. It may be determined whether a web crawl of the identified website performed by an additional on-premises device located at another premises results in the other on-premises device detecting the low prevalence file. A location of the other premises may be different than a location of the premises of the user.

In some embodiments, upon determining the low prevalence file is detected by the predetermined server, a reputation of the identified website may be reduced. Upon determining the low prevalence file is detected by the additional on-premises device and not detected by the predetermined server, a notification may be generated that includes an alert that the identified website distributes a malicious software attack designed to target the user. Upon determining the low prevalence file is not detected by either the additional on-premises device or the predetermined server, a request may be generated for the additional on-premises device, the predetermined server, or both, to perform a web crawl of the identified website.

Some embodiments may include executing on-premises software in conjunction with an on-premises device located at a premises of the user. The on-premises device may be connected to an internet gateway at the premises of the user. Based on the web crawl, a file from the website may be identified as a low prevalence file. A virus scan may be performed on the low prevalence file to determine whether the low prevalence file is malicious.

A computing device configured to detect selective malware attacks is also described. The device may include a processor and memory in electronic communication with the processor. The memory may store instructions that are executable by the processor to identify a website visited by a user, wherein a number of visits to the website satisfies a predetermined threshold, perform a web crawl on the identified website, and analyze results of the web crawl to determine whether the identified website distributes a malicious software attack designed to selectively attack visitors to the website.

A computer-program product to detect selective malware attacks is also described. The computer-program product may include a non-transitory computer-readable medium that stores instructions. The instructions may be executable by a processor to identify a website visited by a user, wherein a number of visits to the website satisfies a predetermined threshold, perform a web crawl on the identified website, and analyze results of the web crawl to determine whether the identified website distributes a malicious software attack designed to selectively attack visitors to the website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a flow diagram illustrating one embodiment of a method for detecting selective malware attacks;

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting selective malware attacks. More specifically, the systems and methods described herein relate to detecting selective malware attacks in connection with one or more on-premises devices. For various reasons, a person may exploit security loopholes in order to plant malware on a website. In some cases, the person may plant the malware on websites deemed most likely to be visited by a target of interest. For example, organization A may hire a person to target organization B. Instead of directly attacking organization B, the attacker may determine which websites organization B visits most often. Such websites may be referred to as "watering hole" websites, an allusion to a predator simply waiting for prey to show up at a frequently attended watering hole instead of attacking the prey directly.

Relying on websites trusted by the target group, the attacker infects one or more of these "watering-hole" websites with malware. Eventually, a member of the targeted group (i.e., organization B) may visit the malware-infected website and in turn may become infected. The infection may include a back door connection allowing the attacker to gain access to confidential information. These so-called "watering-hole" attacks have been used as stepping stones to conduct espionage attacks against a host of targets across a variety of industries, including defense, government, academia, financial services, healthcare and utilities sectors.

Because selective malware attacks selectively target victims, current malware detection systems typically remain behind the curve when it comes to detecting such attacks. By the time a current system detects an attack from malicious software, the action that caused the attack to occur has likely passed (i.e., visiting a trusted website and unwittingly downloading a backdoor connection). With current systems, there is likely little cause for the targeted victim to suspect that the website is to blame. A subsequent scan of the website by a computing device dedicated to scanning websites for malicious content (e.g., performing a SYMANTEC® SafeWeb scan using a Symantec server) may detect no suspicious content because the website may recognize the internet protocol (IP) address of the dedicated malware scanning device and refrain from distributing the attack against such recognized IP addresses. For example, the attacker may include certain IP addresses on a blacklist where the malware is designed not to attack a device using an IP address on the blacklist. Additionally, or alternatively, a website may include certain IP addresses on a white list where the malware is designed to attack only if the connecting device is using an IP address that is on the white list. Thus, in some cases the attacker may configure the website to distribute malware to any visitor so long as their IP address is not on a blacklist, to distribute only to those IP addresses on a whitelist, or any possible combination of using both a blacklist and a whitelist to filter attacks. Accordingly, based on current systems and methods, the source of the attack typically remains undetected. In order to notify users of potential attacks, the present systems and methods may detect emerging, zero-day selective malware attacks and provide notification of potential malicious and/or hacked websites in real time.

Figure 1:
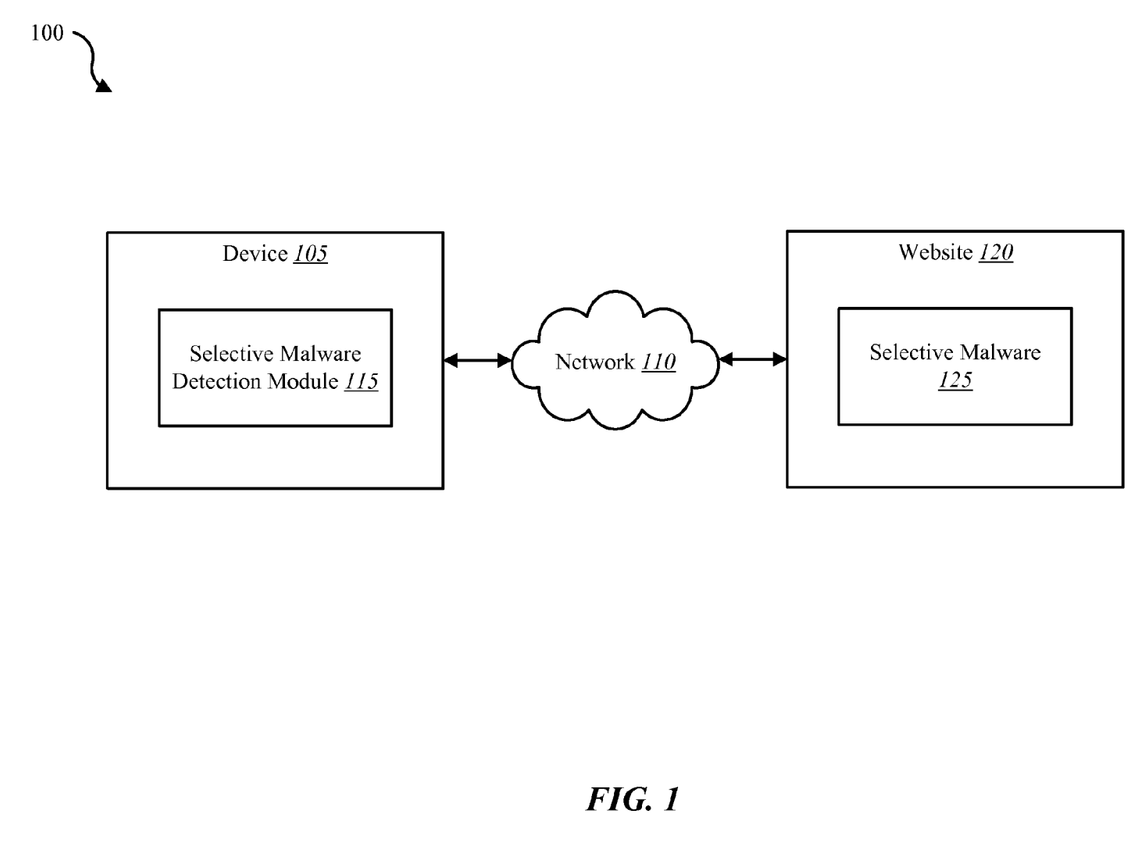
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a single device (e.g., device 105). As depicted, environment 100 may include device 105, network 110, and website 120. A selective malware detection module 115 may be located on device 105, which may be configured to detect selective malware attacks. In some embodiments, website 120 may contain selective malware 125. Although only one website is depicted in environment 100, it is understood that multiple websites may be infected with selective malware configured to target device 105 in a malware attack. Examples of device 105 include mobile computing devices, smart phones, personal computing devices, computers, servers, etc.

In some cases, device 105 may connect to website 120 via network 110. Examples of network 110 include any combination of local area networks (LAN), wide area networks (WAN), virtual private networks (VPN), wireless networks (using 802.11, for example), cellular networks (using 3G and/or LTE, for example), etc. In some configurations, the network 110 may include the internet. Thus, network 110 may include one or more gateway devices, access points, routers, switches, dynamic host configuration protocol (DHCP) servers, etc., that enable computing devices to connect to the internet.

In some cases, selective malware detection module 115 may identify potential selective malware attacks by searching through content from one or more pre-filtered websites (e.g., web crawling, web indexing, web scraping, web spidering, web scuttering, etc.). For example, module 115 may scan website 120 to determine whether website 120 contains malware that targets only certain devices (e.g., selective malware 125 configured to target device 105). In some cases, a process of selecting which devices to attack may be based on a network identifier that identifies one or more computing devices (e.g., IP address, media access control (MAC) address, device identification, globally unique identification (GUID), etc.). Thus, selective malware 125 may be designed to target only those devices that satisfy its filtering process. Accordingly, selective malware detection module 115 may be configured to identify the filtering process used by selective malware 125 in order to identify the source of a malware attack and to notify one or more users regarding the attack.

In some cases, module 115 may detect the filtering process by monitoring the occurrence and non-occurrence of certain low prevalence programs, files, and/or data among one or more pre-filtered websites. Module 115 may compare its own search results with the search results from another device, where the other device performs a scan of the same website. Based on the comparison of the two sets of search results, module 115 may notify a user in real-time of potential attacks. Further details regarding the selective malware detection module 115 are discussed below with regards to FIGS. 2 and/or 3.

Figure 2:
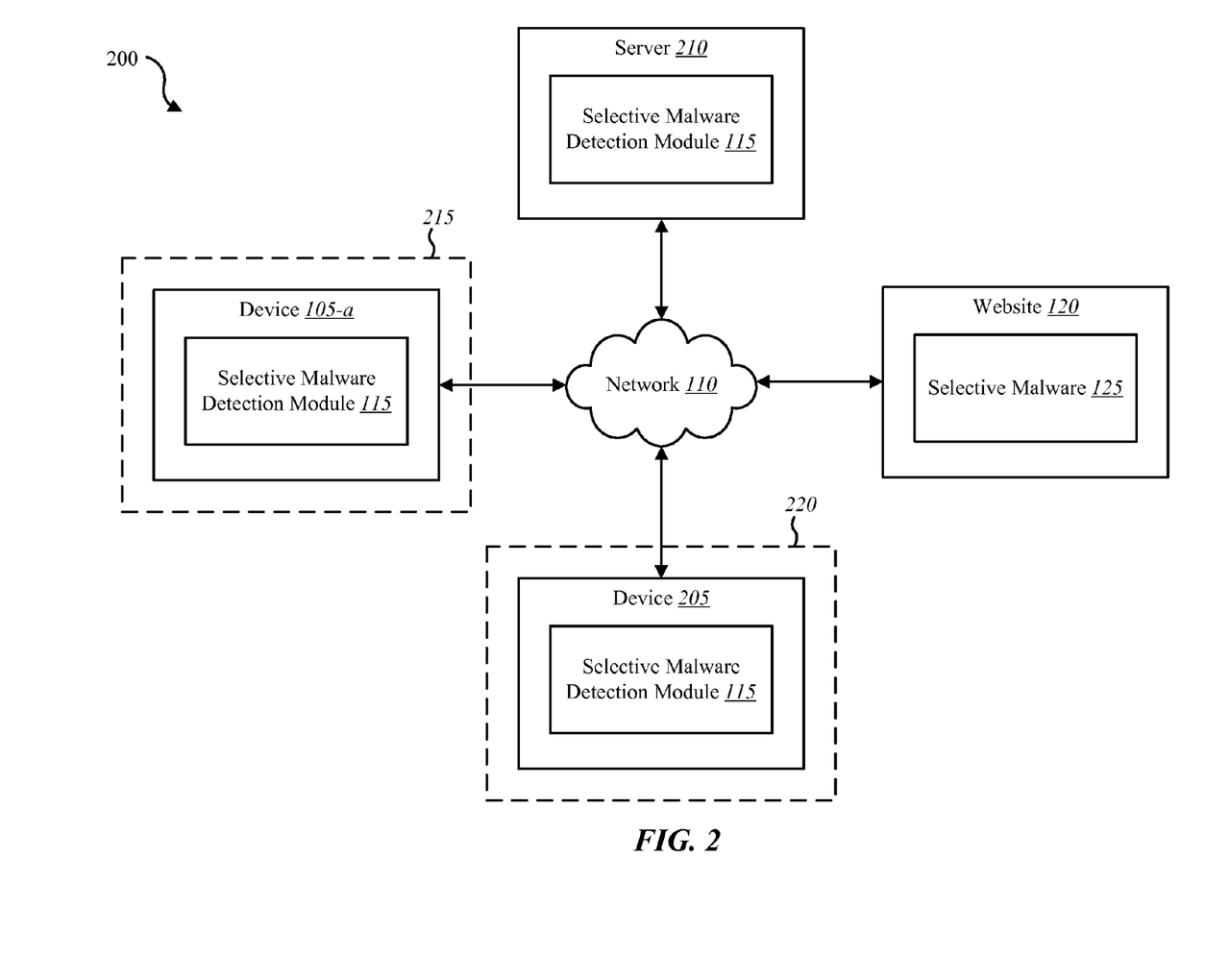
FIG. 2 is a block diagram illustrating another embodiment of an environment in which the present systems and methods may be implemented.
Figure 3:
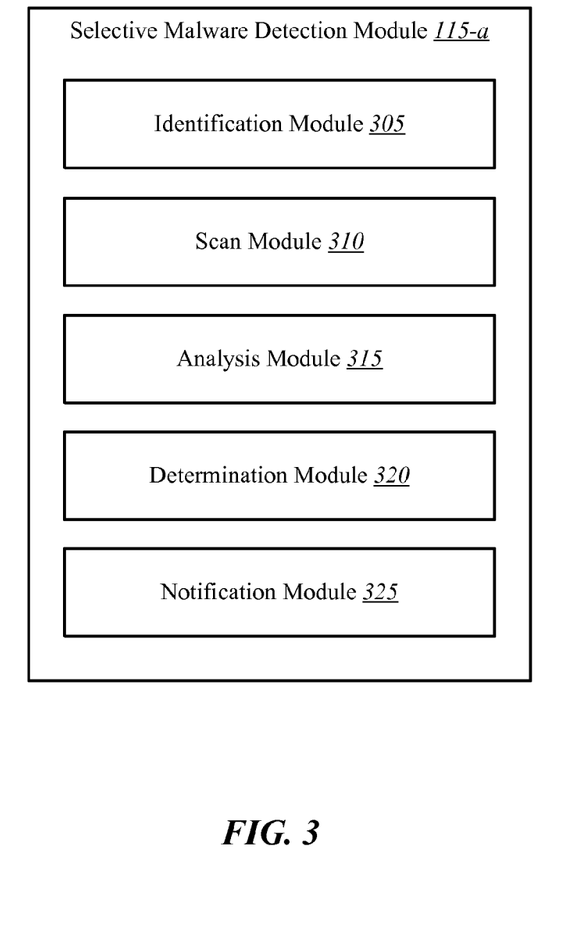
FIG. 3 is a block diagram illustrating one example of a selective malware detection module.

FIG. 2 is a block diagram illustrating another embodiment of an environment 200 in which the present systems and methods may be implemented. As depicted, environment 200 may include device 105-a, network 110, website 120, device 205, and server 210. In some cases, device 105-a may be located at a first location 215, while device 205 may be located at a second location 220, where the first and second locations 215 and 220, respectively, are at different locations (e.g., different addresses, different cities, different countries, etc.). In some cases, device 105-a may be a computing device of a first organization, device 205 of a second organization, and server 210 of a third organization, where each the organizations are different organizations. For example, device 105-a may belong to a government agency, device 205 may belong to a non-profit organization, and server 210 may belong to a corporation.

In some embodiments, device 105-a may communicate with server 210 via network 110. In some configurations, device 105-*a* may be one example of the device 105 illustrated in FIG. 1. Although devices 105-*a* and 205, and server 210 are depicted including module 115, in some embodiments, one or more of the depicted devices may not include a selective malware detection module 115. In some cases, device 105-*a* may include an application that allows device 105-*a* to interface with the selective malware detection module 115 located on server 210 and/or device 205. In some embodiments, both devices 105-*a* and 205 as well as server 210 may include at least a portion of selective malware detection module 115, where at least a portion of the functions of the selective malware detection module 115 are performed separately on either device 105-*a*, device 205, or server 210, and/or concurrently on any combination of the three. In some configurations, an application may enable the device 105-*a* to interface with the selective malware detection module 115 to identify potential selective malware attacks by crawling pre-filtered websites, and comparing the search results from one device with the search results of two or more other devices in order to determine whether to notify a user in real-time of potential selective malware attacks.

FIG. 3 is a block diagram illustrating one example of a selective malware detection module 115-*a*. The selective malware detection module 115-*a* may be one example of the selective malware detection module 115 depicted in FIGS. 1 and/or 2. As depicted, the selective malware detection module 115-*a* may include an identification module 305, a scan module 310, an analysis module 315, a determination module 320, and a notification module 325. In some cases, server 210 may control one or more of the operations described below by sending one or more commands to device 105-*a* over network 110. Additionally, or alternatively, device 105-*a* may perform one or more of the operations autonomously. In some cases, device 105-*a* may generate a record of the results of performing one or more operations described below, which record server 210 may subsequently retrieve and analyze.

In one embodiment, the identification module 305 may identify a plurality of websites that are pre-filtered according to a predetermined criteria. For example, module 305 may identify a website visited by a user where a number of visits to the website satisfies a predetermined threshold. In some cases, identification module 305 may analyze a log associated with a firewall and/or proxy log of an internet device (server, gateway, router, etc.) at the premises of the user to identify those websites the user visits relatively most often. Thus, identification module 305 may select a group of websites, analyze the group of websites and filter out those websites that satisfy the predetermined threshold or criteria. The predetermined criteria may include satisfying a predetermined visit rate such as a number of visits over a certain time period (e.g., visits per hour, day, week, month, and the like). For example, visits to a certain website may satisfy the threshold if the user visits the certain website more than 5 times per week. Additionally, or alternatively, the criteria may include satisfying a predetermined number of visits independent of a time period (e.g., more than 10 separate visits satisfies the threshold). The criteria may also include satisfying a relative visit rate where the average visit rate to all websites is compared to the average visit rate to a particular website. Thus, in some cases, the top ten relatively highest-visited websites may satisfy the relative visit rate threshold.

In some embodiments, scan module 310 may perform a web crawl on the one or more identified websites. Analysis module 315 may analyze results of the web crawl of an identified website to determine whether the identified website distributes a malicious software attack designed to selectively attack only certain visitors to the website. For example, a visit to a website with malicious content could result in infection from a drive-by-download. A drive-by-download, sometimes referred to as a drive-by-installation, may refer to a user unknowingly downloading and/or installing certain software. It also may refer to downloads and installs that a user authorizes without realizing that the software contains malware. For example, downloading certain software may result in the user installing an unknown or counterfeit executable program, ActiveX component, Java applet, or javascript (e.g., resulting in shellcode executing in the browser). In some cases, the website may contain links that result in malware downloads. Attacker may rely on social engineering to entice the user to install the downloaded files containing malicious software.

As described above, an attacker may use a blacklist and/or a whitelist to filter attacks based on a network identification of a computing device connecting to an infected website. For example, device 105-*a* may use an IP address of 10.10.0.1, device 205 may use an IP address of 12.30.10.5, and server 210 may use an IP address of 68.32.40.3. In some cases, a blacklist associated with selective malware 125 may include the IP address 68.32.40.3. Accordingly, if server 210 attempts to connect and scan website 120, selective malware 125 may not attempt to attack server 210 based on the IP address of server 210 being on the blacklist. Additionally, or alternatively, a whitelist associated with selective malware 125 may include the IP address 10.10.0.1 and/or 12.30.10.5. Accordingly, in some cases, selective malware 125 may attack device 105-*a* and/or device 205 because the IP addresses used by these devices are found on the whitelist.

As an example, a first organization may suspect a second organization is a victim of a selective malware attack. In order to combat selective malware attacks that are designed not to attack certain IP addresses, the first organization may locate and operate a web-crawling device and/or execute web-crawling software at the second location. Consequently, the web-crawling device and/or web-crawling software may operate using IP addresses different than those used by the first organization. Thus, in some cases, scan module 310 may execute on-premises software in conjunction with an on-premises device operated offsite. The on-premises device may be connected to an internet gateway at the second location, thus acquiring an IP address associated with the second location. Based on a web crawl of a website, identification module 305 may identify a file from the website as a low prevalence file. A low prevalence file may be a file that is relatively unknown and thus a potentially dangerous file. For example, a low prevalence file may be a file that has not yet been scanned and/or classified by reputation-based technology configured to provide reputations for files, websites, etc. In some embodiments, scan module 310 may perform a virus scan on the low prevalence file to determine whether the low prevalence file is malicious.

In some cases, a web crawl of website 120 by device 105-*a* at location 215 may identify a low prevalence file. The low prevalence file may be associated with selective malware 125. In some cases, determination module 320 may determine whether a web crawl of website 120 performed by server 210 results in the server 210 also identifying the same low prevalence file. Upon determining the low prevalence file is detected at least by server 210 and device 105-*a*, determination module 320 may reduce a reputation of website 120, at least until or if the low prevalence file develops a reputation as being a safe file. Additionally, or alternatively, determination module 320 may determine whether a web crawl of website 120 performed by device 205, located at location 220, results in device 205 identifying the same low prevalence file detected by device 105-*a*. Upon determining the low prevalence file is detected by the additional on-premises device, but not detected by the predetermined server, selective malware detection module 115 may determine that device 105 is part of a selective malware attack configured to target device 105-*a*, but refrain from attacking server 210 so as to avoid detection. Accordingly, notification module 325 may generate a notification comprising an alert notifying a user associated with device 105 that website 120 comprises selective malware 125 designed to target the user.

In some cases, the web crawl of website 120 by device 105-*a* may be the first time the low prevalence file has been encountered among a select group of devices. Accordingly, upon determining the low prevalence file is detected by device 105-*a*, but no attempt has been made by either device 205 or server 210 to detect the same file at the same website, scan module 310 may generate a request for device 205 and/or server 210 to perform a scan of website 120 in order to acquire additional data wherewith to better classify website 120 and/or to determine whether website 120 includes selective malware 125.

FIG. 4 is a flow diagram illustrating one embodiment of a method 400 for detecting selective malware attacks. In some configurations, the method 400 may be implemented by the selective malware detection module 115 illustrated in FIGS. 1, 2, and/or 3.

At block 405, a website visited by a user may be identified. It may be determined that a number of visits to the website by the user satisfies a predetermined threshold. At block 410, a web crawl may be performed on the identified website. At block 415, results of the web crawl may be analyzed to determine whether the identified website includes a malicious software attack designed to selectively attack visitors to the website.

Figure 5:
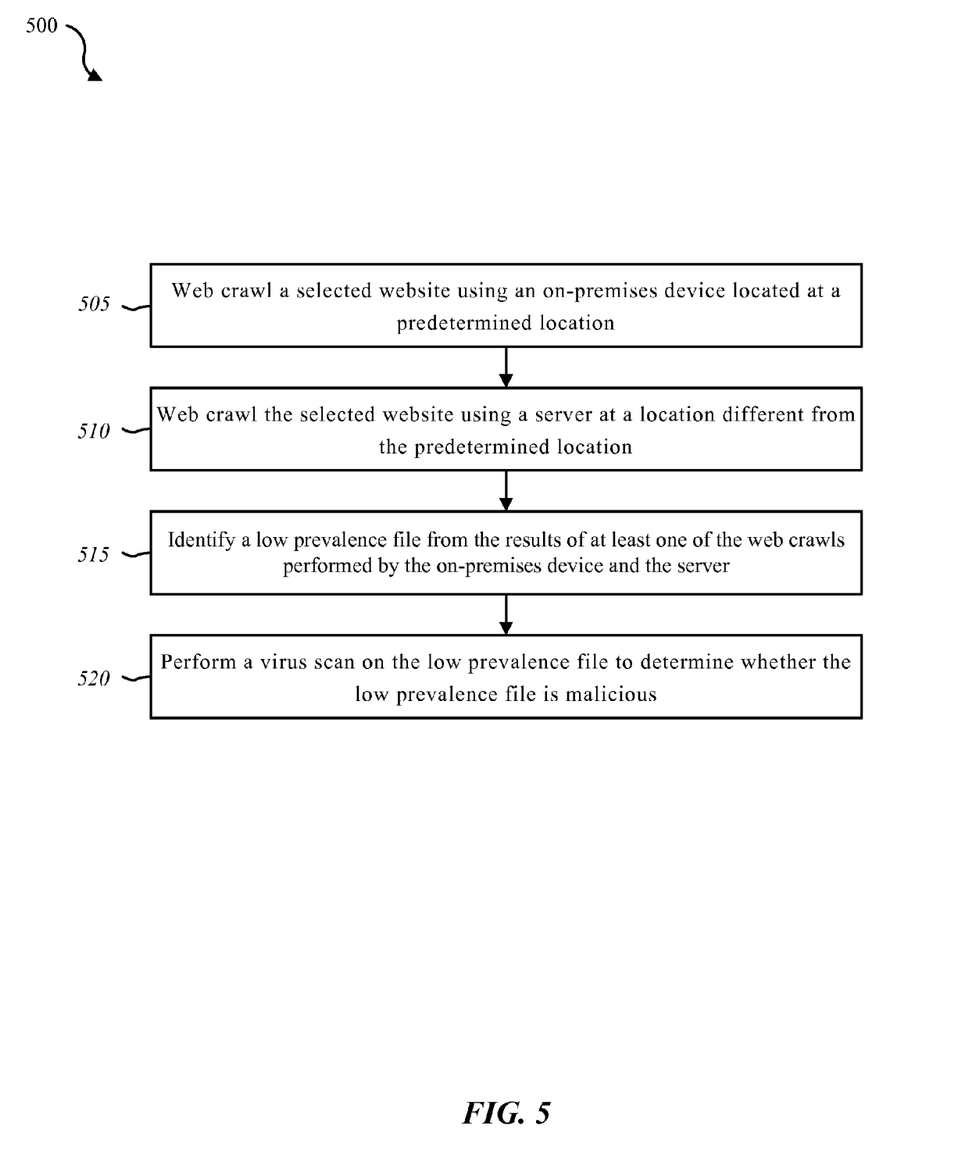
FIG. 5 is a flow diagram illustrating one embodiment of a method for identifying low prevalence files in association with selective malware attacks.

FIG. 5 is a flow diagram illustrating one embodiment of a method 500 for identifying low prevalence files in association with selective malware attacks. In some configurations, the method 500 may be implemented by the selective malware detection module 115 illustrated in FIGS. 1, 2, and/or 3.

At block 505, a selected website may be web crawled using an on-premises device located at a predetermined location. At block 510, the selected website may be web crawled using a server at a location different from the predetermined location. At block 515, a low prevalence file may be identified from at least one of the web crawls. At block 520, a virus scan may be performed on the low prevalence file to determine whether the low prevalence file is malicious.

Figure 6:
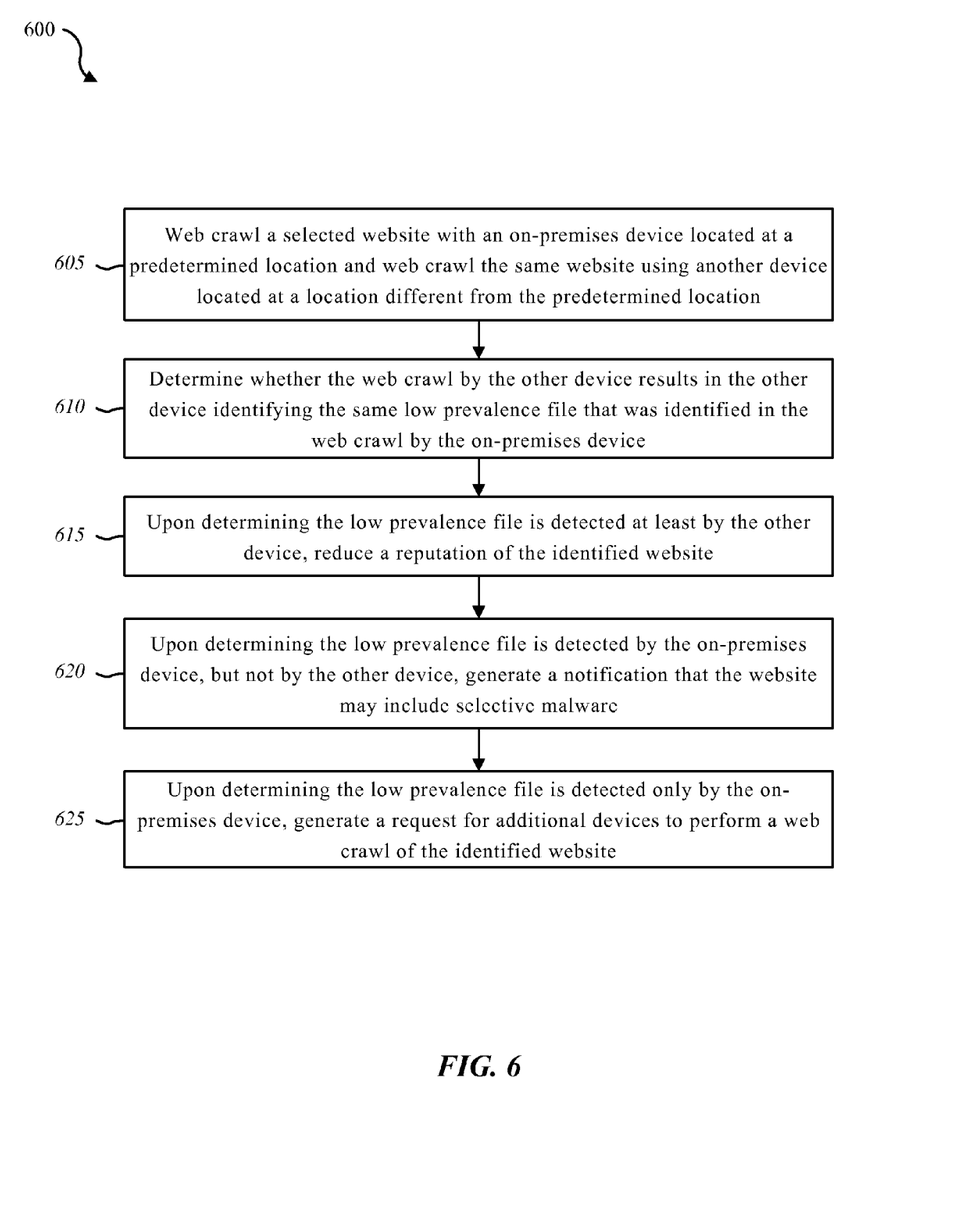
FIG. 6 is a flow diagram illustrating one embodiment of a method for generating a notification upon detecting a selective malware attack.

FIG. 6 is a flow diagram illustrating one embodiment of a method 600 for generating a notification upon detecting a selective malware attack. In some configurations, the method 600 may be implemented by the selective malware detection module 115 illustrated in FIGS. 1, 2, and/or 3.

At block 605, a selected website may be web crawled with an on-premises device located at a predetermined location and a server located at a location different from the predetermined location. At block 610, it may be determined whether the web crawl by the other device results in the other device identifying the same low prevalence file identified in the web crawl by the on-premises device. At block 615, upon determining the low prevalence file is detected at least by the other device, a reputation of the identified website may be reduced. At block 620, upon determining the low prevalence file is detected by the on-premises device, but not by the other device, a notification that the website may include selective malware may be generated. At block 625, upon determining the low prevalence file is detected only by the on-premises device, a request for additional devices to perform a web crawl of the identified website may be generated.

Figure 7:
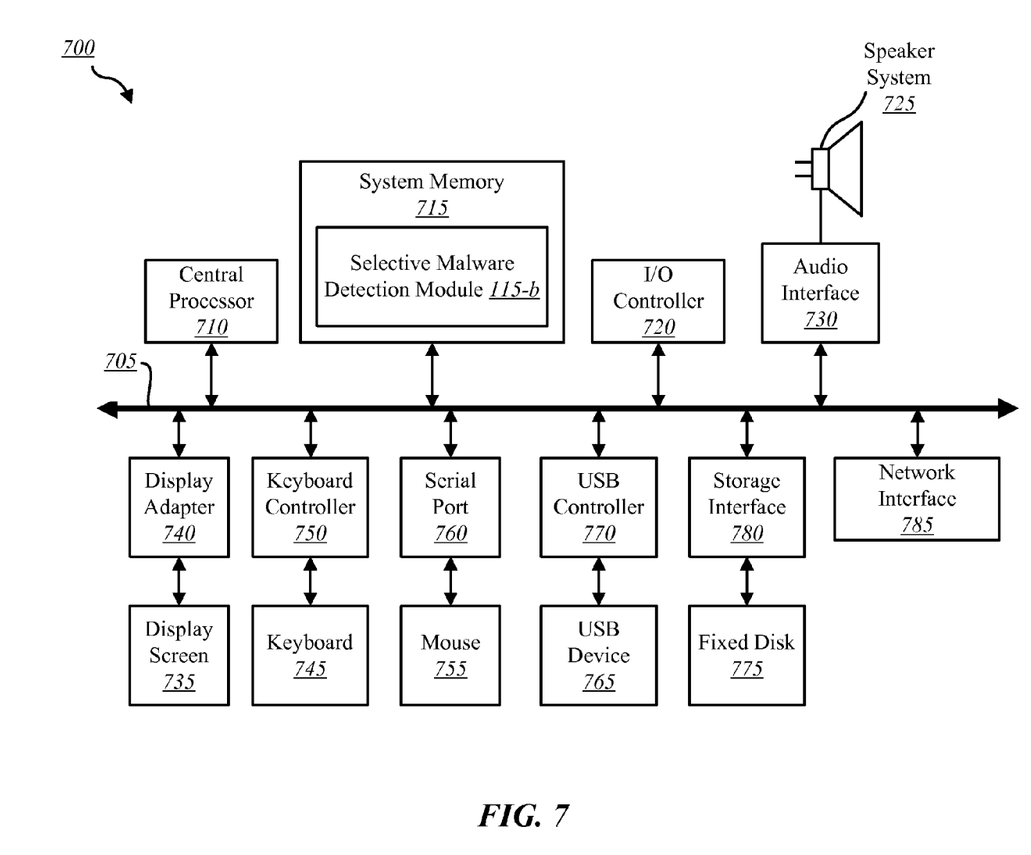
FIG. 7 depicts a block diagram of a computer system suitable for implementing the present systems and methods.

FIG. 7 depicts a block diagram of a computer system 700 suitable for implementing the present systems and methods. Computer system 700 includes a bus 705 which interconnects major subsystems of computer system 700, such as a central processor 710, a system memory 715 (typically RAM, but which may also include ROM, flash RAM, or the like), an input/output controller 725, an external audio device, such as a speaker system 725 via an audio output interface 730, an external device, such as a display screen 735 via display adapter 740, a keyboard 745 (interfaced with a keyboard controller 750) (or other input device), multiple USB devices 765 (interfaced with a USB controller 770), and a storage interface 780. Also included are a mouse 755 (or other point-and-click device) connected to bus 705 through serial port 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the selective malware detection module 115-*b* to implement the present systems and methods may be stored within the system memory 715. Applications resident with computer system 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of computer system 700, can connect to a standard computer readable medium for storage and/or retrieval of information, such as a fixed disk drive 775. Fixed disk drive 775 may be a part of computer system 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 715 or fixed disk 775. The operating system provided on computer system 700 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for detecting selective malware attacks, the method comprising:
   identifying a website visited by a first device operating at a first location, wherein a number of visits to the website satisfies a predetermined threshold;
   identifying a low prevalence file based on a web crawl of the identified website performed by the first device at the first location, wherein the low prevalence file comprises a file unclassified by a predetermined server;
   determining whether a web crawl of the identified website performed by the predetermined server results in the predetermined server detecting the low prevalence file;
   determining whether a web crawl of the identified website performed by a second device operating at a second location results in the second device detecting the low prevalence file;
   analyzing, by at least one of the first device, second device, and the predetermined server, results of the web crawls to determine whether the identified website distributes a malicious software attack designed to selectively attack visitors to the website; and
   upon determining the low prevalence file is detected by the second device and not detected by the predetermined server, generating a notification comprising an alert that the identified website is suspected of distributing a malicious software attack designed to target the first device.

2. The method of claim 1, further comprising:
   upon determining the low prevalence file is identified by the predetermined server, reducing a reputation of the identified website.

3. The method of claim 1, further comprising:
   upon determining the low prevalence file is detected by the first device, generating a request for the second device, the predetermined server, or both, to perform a web crawl of the identified website.

4. The method of claim 1, further comprising:
   executing on-premises software in conjunction with the first device, the first device being connected to an internet gateway at the first location.

5. The method of claim 1, further comprising:
   performing a virus scan on the low prevalence file to determine whether the low prevalence file is malicious.

6. A computing device configured to detect selective malware attacks, comprising:
   a processor;
   memory in electronic communication with the processor;
   instructions stored in the memory, the instructions being executable by the processor to:
   identify a website visited by a first device operating at a first location, wherein a number of visits to the website satisfies a predetermined threshold;
   identify a low prevalence file based on a web crawl of the identified website performed by the first device at the first location, wherein the low prevalence file comprises a file unclassified by a predetermined server;
   determine whether a web crawl of the identified website performed by the predetermined server results in the predetermined server detecting the low prevalence file;
   determine whether a web crawl of the identified website performed by a second device operating at a second location results in the second device detecting the low prevalence file;

analyze, by at least one of the first device, second device, and the predetermined server, results of the web crawls to determine whether the identified website distributes a malicious software attack designed to selectively attack visitors to the website; and upon determining the low prevalence file is detected by the second device and not detected by the predetermined server, generate a notification comprising an alert that the identified website is suspected of distributing a malicious software attack designed to target the first device.

7. The computing device of claim 6, wherein the instructions are executable by the processor to:

upon determining the low prevalence file is identified by the predetermined server, reduce a reputation of the identified website.

8. The computing device of claim 6, wherein the instructions are executable by the processor to:

upon determining the low prevalence file is detected by the first device, generate a request for the second device, the predetermined server, or both, to perform a web crawl of the identified website.

9. The computing device of claim 6, wherein the instructions are executable by the processor to:

execute on-premises software in conjunction with the first device, the first device being connected to an internet gateway at the first location.

10. The computing device of claim 6, wherein the instructions are executable by the processor to:

perform a virus scan on the low prevalence file to determine whether the low prevalence file is malicious.

11. A computer-program product for detecting, by a processor, selective malware attacks, the computer-program product comprising a non-transitory computer-readable medium storing instructions thereon, the instructions being executable by the processor to:

identify a website visited by a first device operating at a first location, wherein a number of visits to the website satisfies a predetermined threshold;

identify a low prevalence file based on a web crawl of the identified website performed by the first device at the first location, wherein the low prevalence file comprises a file unclassified by a predetermined server;

determine whether a web crawl of the identified website performed by the predetermined server results in the predetermined server detecting the low prevalence file;

determine whether a web crawl of the identified website performed by a second device operating at a second location results in the second device detecting the low prevalence file;

analyze, by at least one of the first device, second device, and the predetermined server, results of the web crawls to determine whether the identified website distributes a malicious software attack designed to selectively attack visitors to the website;

upon determining the low prevalence file is detected by the second device and not detected by the predetermined server, generate a notification comprising an alert that the identified website is suspected of distributing a malicious software attack designed to target the first device.

\* \* \* \* \*